(12) United States Patent
Li (10) Patent No.: US 9,660,469 B2
(45) Date of Patent: May 23, 2017

(54) MULTI-BATTERY CHARGING CIRCUIT AND CHARGING METHOD THEREOF

(71) Applicant: Lenovo (Beijing) Co., Ltd., Beijing (CN)

(72) Inventor: Xianxi Li, Beijing (CN)

(73) Assignee: LENOVO (BEIJING) CO., LTD., Haidan District, Beijing (CN)

( * ) Notice: Subject to any disclaimer, the term of this patent is extended or adjusted under 35 U.S.C. 154(b) by 119 days.

(21) Appl. No.: 14/636,710

(22) Filed: Mar. 3, 2015

(65) Prior Publication Data

US 2016/0094067 A1 Mar. 31, 2016

(30) Foreign Application Priority Data

Sep. 25, 2014 (CN) .......................... 2014 1 0498211

(51) Int. Cl.
*H02J 7/00* (2006.01)
*H02J 7/04* (2006.01)

(52) U.S. Cl.
CPC .......... *H02J 7/0052* (2013.01); *H02J 7/0013* (2013.01); *H02J 7/0073* (2013.01); *H02J 7/041* (2013.01); *H02J 2007/005* (2013.01)

(58) Field of Classification Search
CPC .............................. H02J 7/0052; H02J 7/0073
USPC .................................................. 320/107, 125
See application file for complete search history.

(56) References Cited

U.S. PATENT DOCUMENTS

| | | | | |
|---|---|---|---|---|
| 3,579,075 A | * | 5/1971 | Floyd .................... | H02J 7/0045 320/110 |
| 3,829,753 A | * | 8/1974 | Marshall ............... | H02J 7/1423 320/104 |
| 5,111,132 A | * | 5/1992 | Motose ................. | H02J 7/1423 320/125 |
| 6,009,000 A | | 12/1999 | Siri | |

(Continued)

FOREIGN PATENT DOCUMENTS

| | | |
|---|---|---|
| CN | 202260494 U | 5/2012 |
| CN | 103326439 A | 9/2013 |
| CN | 1505235 | 6/2014 |

OTHER PUBLICATIONS

First Office Action dated Jan. 21, 2016 out of corresponding Chinese priority Application No. 201410498211.2 (22 pages including English translation).

(Continued)

*Primary Examiner* — M'Baye Diao
(74) *Attorney, Agent, or Firm* — Brinks Gilson & Lione; G. Peter Nichols (57) ABSTRACT

A multi-battery charging circuit is described and it includes an electric power detecting unit for detecting remaining amount of electric power of each battery; a charging deciding unit provided with a first amount of electric power threshold and for comparing the remaining amount detected with the first threshold; and a charging unit for charging a plurality of batteries with a first strategy in a first time period, and with a second strategy in a second time period when the remaining amount of electric power of one or more of the batteries is equal to a second amount of electric power threshold, and with a third strategy in a third time period when the remaining amount is equal to a third amount of electric power threshold.

20 Claims, 4 Drawing Sheets

(56) References Cited

U.S. PATENT DOCUMENTS

| | | | | |
|---|---|---|---|---|
| 7,898,213 B2* | 3/2011 | Law | ................... | H02J 7/0003 |
| | | | | 320/107 |
| 8,159,184 B2* | 4/2012 | Emori | ................... | B60L 3/0046 |
| | | | | 307/10.1 |
| 8,723,527 B2* | 5/2014 | Kudo | ................... | B60L 3/0046 |
| | | | | 320/125 |
| 9,112,371 B2* | 8/2015 | Wakatabe | ........... | H01M 10/441 |
| 2004/0108835 A1 | 6/2004 | Kim | | |
| 2007/0156179 A1* | 7/2007 | S.E. | ................... | A61N 1/36089 |
| | | | | 607/2 |
| 2013/0271068 A1* | 10/2013 | Komoda | ............. | H01M 10/482 |
| | | | | 320/107 |
| 2014/0009117 A1* | 1/2014 | Ishii | ..................... | H02J 7/34 |
| | | | | 320/126 |
| 2015/0236523 A1* | 8/2015 | Takano | ................... | H02J 7/007 |
| | | | | 320/107 |

OTHER PUBLICATIONS

Second Office Action dated Oct. 9, 2016 (21 pages including English translation) out of Chinese priority Application No. 201410498211.2.
Third Office Action, and English language translation thereof, in corresponding Chinese Application No. 201410498211.2, dated Apr. 10, 2017, 24 pages.

* cited by examiner

MULTI-BATTERY CHARGING CIRCUIT AND CHARGING METHOD THEREOF

This application claims priority to Chinese patent application No. 201410498211.2 filed on Sep. 25, 2014, the entire contents of which is incorporated herein by reference.

BACKGROUND

This disclosure relates to a charging circuit and a charging method thereof, and particularly to a multi-battery charging circuit and a charging method thereof which are able to improve charging efficiency of a plurality of batteries.

A process of charging of a battery is generally divided into a PC (pre-charging) phase, a CC (constant current) phase and a CV (constant voltage) phase.

The PC phase adopts a trickle mode to charge the battery, and a charging current in this phase is relatively small. When an amount of electric power of a battery is very low, using the trickle mode can avoid damage to internal structure of the battery due to an impact of a large current, so as to protect the battery, and a trickle charging may also prevent a problem of over-charging. However, time spent by the trickle charging is too long, and thus it is usually used in combination with other charging mode (e.g., a constant current charging, a constant voltage charging) in practice.

The CC phase adopts a constant current mode to charge the battery, a constant current is generally a maximum current allowable by a target battery, and an advantage of this charging mode is a fast charging velocity and a short charging time. However, since the battery itself generates a reverse potential to a charging current at the time of charging, a part of the charging current is converted into heat energy for counteracting the reverse potential, and thus larger the charging current is, more the heat energy converted is, and higher temperature at the time of charging is. Too high temperature would influence a service life of the battery, thus it is used in combination with other charging mode in practice.

The CV phase adopts a constant voltage mode to charge the battery, that is, charges the battery with a certain voltage, and the charging current would decrease gradually until the battery is fully charged according to a saturation level of a core of the battery in this phase. The constant voltage charging mode can prevent a battery voltage to be too high and cause over-charging, so as to achieve a purpose of protecting the battery.

In practice, the process of charging of the battery may be determined by a remaining amount of electric power of the battery, so as to include one or more of the above-described PC phase, CC phase and CV phase. For example, if the remaining amount of electric power of the battery is very much, the charging can be carried out by only executing the PC phase or the CV phase; and if the remaining amount of electric power of the battery is very few, the charging can be carried out by executing the above-described three phases in order sequentially.

However, with popularity of mobile apparatus, a requirement to endurance ability of the battery by the user increases, a single piece of battery is difficult to satisfy a requirement of a daily used mobile apparatus of the user. Adopting dual-battery or multi-battery to supply power is an effective way to extend the endurance ability of the battery. Taking power supply of the dual-battery as example, two kinds of charging schemes are generally adopted in practice: the first is adopting two charging circuits to use a charging mode of the above-described three phases to charge the two batteries respectively, and an advantage is a fast charging velocity and defects are a high cost and high temperature of the charging circuit; the second is adopting a single charging circuit to charge the two batteries in time-sharing.

Therefore, how to charge dual-battery or multi-battery more time saving and more efficiently in case of ensuring using a single charging circuit becomes a conventional technical problem to be solved.

SUMMARY

In order to solve the above-described technical problem, a purpose of this disclosure is to provide a multi-battery charging circuit and a charging method thereof which are able to improve charge efficiency of a plurality of batteries.

According to one aspect, there provides a multi-battery charging circuit including: an electric power detecting unit configured to detect a remaining amount of electric power of each battery; a charging deciding unit provided with a first amount of electric power threshold and configured to compare the remaining amount of electric power of each battery detected by the electric power detecting unit, wherein the charging deciding unit is operable to charge the batteries when the remaining amount of electric power of the batteries as detected is less than or equal to the first amount of electric power threshold; and a charging unit provided with a second amount of electric power threshold and a third amount of electric power threshold and configured to charge the batteries, wherein the charging unit is operable to charge the batteries with a first strategy in a first time period, and to charge the batteries with a second strategy in a second time period when remaining amount of electric power of one or more of the batteries is equal to the second amount of electric power threshold, and to charge the batteries with a third strategy in a third time period when the remaining amount of electric power of one or more of the batteries is equal to the third amount of electric power threshold, and he first time period, the second time period and the third time period are being successive time periods.

According to another aspect, there provides a multi-battery charging method including: detecting a remaining amount of electric power of each battery; comparing the remaining amount of electric power of each battery with a first amount of electric power threshold, wherein the batteries need to be charged when the remaining amount of electric power of the batteries is less than or equal to the first amount of electric power threshold; and charging the battery which is decided to be charged, wherein the batteries are charged with a first strategy in a first time period, with a second strategy in a second time period when remaining amount of electric power of the batteries is equal to a second amount of electric power threshold, and with a third strategy in a third time period when the remaining amount of electric power of the batteries is equal to a third amount of electric power threshold, the first time period, the second time period and the third time period being successive time periods.

BRIEF DESCRIPTION OF THE DRAWINGS

The above-described and other purposes, advantages and features of this disclosure can be understood more comprehensive in combination with accompanying drawings, and in the figures.

The accompanying drawings are intended to describe exemplary embodiments of this disclosure, and should not be interpreted as limiting scope of this disclosure. The accompanying drawings should not be regarded as being drawn in scale unless being pointed out explicitly.

DETAILED DESCRIPTION

Hereinafter, the preferred embodiments of this disclosure are described detailed with reference to the accompanying drawings. In the specification and accompanying drawings, substantially same elements and functions are represented by same reference numbers, and the repetitive explanation on these elements and functions would be omitted. Further, in order for clarity and simplicity, an explanation of the well-known function and structures is omitted.

Hereinafter, the preferred embodiments of this disclosure are described detailed with reference to the accompanying drawings.

Figure 1:
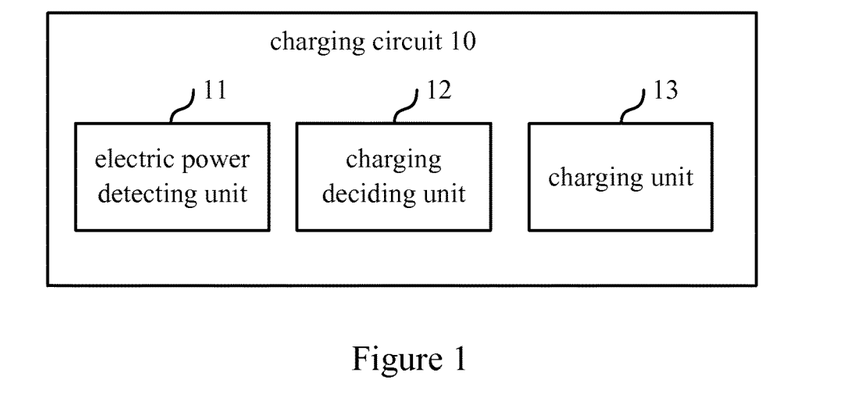
FIG. 1 is a functional block diagram illustrating the multi-battery charging circuit according to a first embodiment.

FIG. 1 is a functional block diagram illustrating the multi-battery charging circuit according to a first embodiment. A multi-battery charging circuit (hereafter referred to as a charging circuit simply) 10 of the first embodiment may be applied in an electronic apparatus such as a tablet computer, a smart phone, a personal digital assistants, a smart wearable apparatus or the like, and the electronic apparatus has N (N≥2) batteries. Of course, when there is only one battery in the electronic apparatus, the charging circuit 10 may also be used, and in this case, the charging circuit 10 may adopt a conventional charging technique to charge this battery.

As shown in FIG. 1, the charging circuit 10 includes an electric power detecting unit 11, a charging deciding unit 12 and a charging unit 13.

The electric power detecting unit 11 is for detecting a remaining amount of electric power of each battery in the N batteries. In particular, the electric power detecting unit 11 is for scanning each battery in order with a predetermined time interval t to acquire instant amount of electric power parameter value of each battery, for example, a voltage value, and calculating the remaining amount of electric power c of each battery accordingly (hereinafter, the remaining amount of electric power c is a percentage of actual amount of electric power to nominal amount of electric power without explicit explanation). The time interval t may be 1 minute, and this disclosure is not limited thereto, and the time interval t may be any time length for those skilled in the art, or may be set by a user according to a practical requirement.

The charging deciding unit 12 is for deciding which battery needs to be charged. In particular, a first amount of electric power threshold C1 is provided in the charging deciding unit 12 in advance, and the charging deciding unit 12 compares the remaining amount of electric power c of each battery detected by the electric power detecting unit 11 with the first amount of electric power threshold C1 respectively, and the charging deciding unit 12 decides that this battery needs to be charged when $c \leq C1$. The first amount of electric power threshold C1 may be 99%, but this disclosure is not limited thereto, and the first amount of electric power threshold C1 may be set by the user in advance, and may also be set by the electronic apparatus according to cases of the remaining amount of electric power of respective batteries.

The charging unit 13 is for charging the battery which is decided to be charged by the charging deciding unit 12. It is specifically divided into the following 3 cases:

Case 1: the battery needs to be charged decided by the charging deciding unit 12 is only one, and the charging unit 13 adopts the conventional charging technique to charge the battery.

Figure 2:
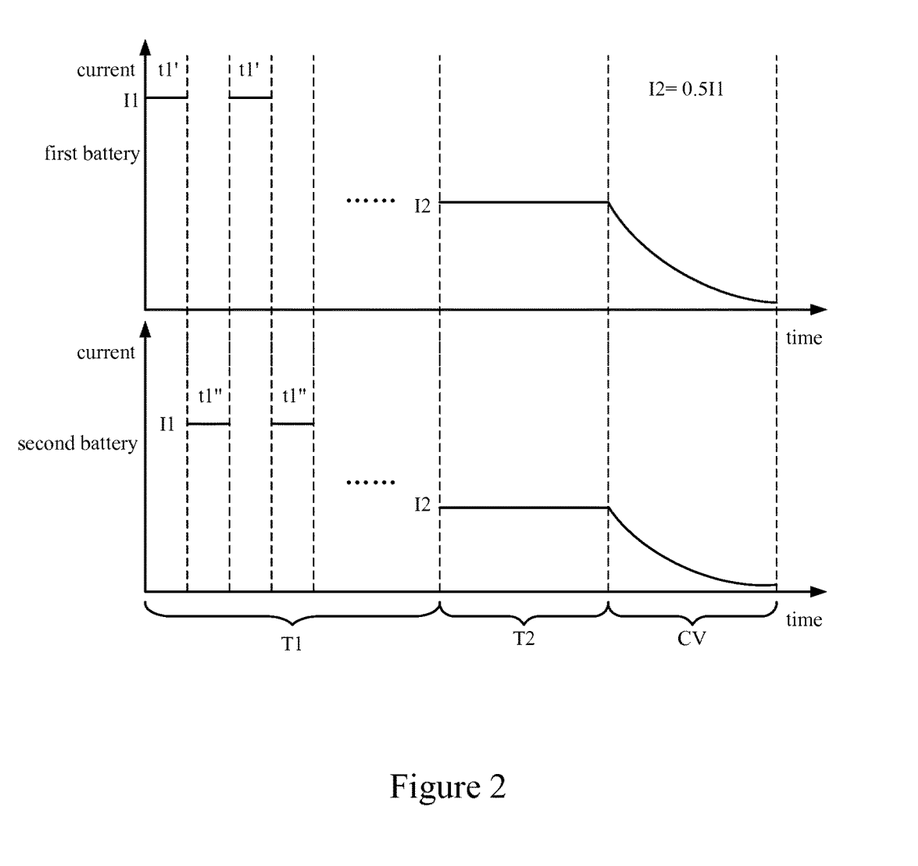
FIG. 2 is a diagram schematically illustrating an electric current of one case of charging two batteries by the multi-battery charging circuit of the first embodiment.
Figure 3:
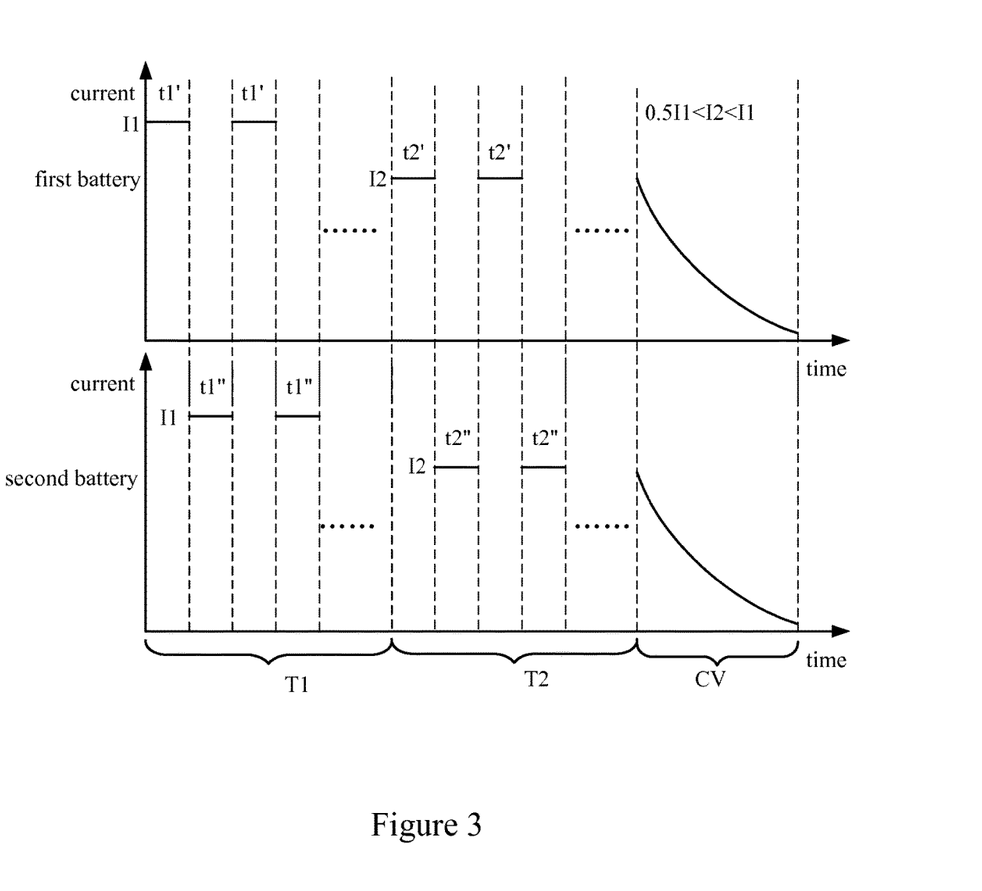
FIG. 3 is a diagram schematically illustrating an electric current of another case of charging two batteries by the multi-battery charging circuit of the first embodiment.
Figure 4:
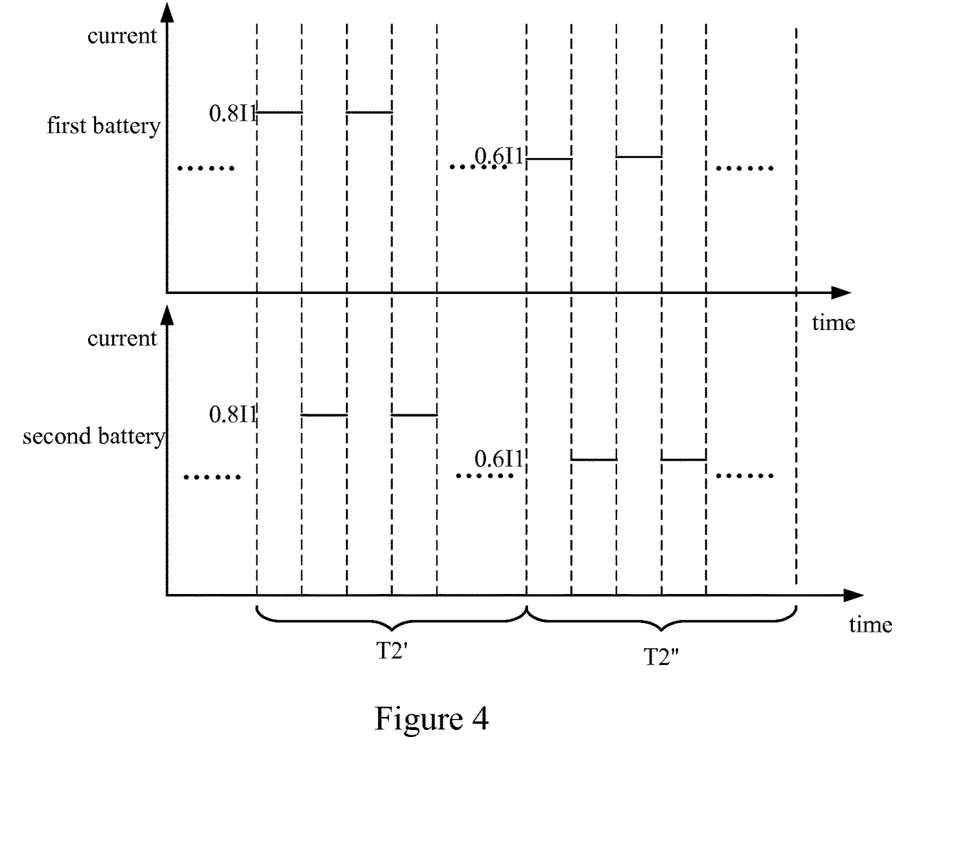
FIG. 4 is a diagram schematically illustrating an electric current of still another case of charging two batteries by the multi-battery charging circuit of the first embodiment.

Case 2: the batteries needs to be charged decided by the charging deciding unit 12 is two pieces (a first battery and a second battery), the charging unit 13 charges the two batteries in a time-sharing manner (that is, the two batteries are charged one after another separately at different moments) in the CC phase, and charges the two batteries by using a constant voltage manner in the CV phase. Hereinafter, the case 2 is described detailed with reference to FIGS. 2 to 4. FIG. 2 is a diagram schematically illustrating an electric current of one case of charging two batteries by the charging circuit 10 of the first embodiment. FIG. 3 is a diagram schematically illustrating an electric current of another case of charging two batteries by the charging circuit 10 of the first embodiment. FIG. 4 is a diagram schematically illustrating an electric current of still another case of charging two batteries by the charging circuit 10 of the first embodiment.

In particular, the charging unit 13 is provided with a second amount of electric power threshold C2 and a third amount of electric power threshold C3 in advance therein, and the charging unit 13 divides the CC phase into two time periods, i.e., a first time period T1 and a second time period T2. Wherein, the charging unit 13 charges the first battery and the second battery alternately in the time sharing manner with a first current 11 in the first time period T1. When the remaining amount of electric power c of the first battery and the second battery both reach the second amount of electric power threshold C2, the process of charging enters into the second time period T2, and the charging unit 13 charges the first battery and the second battery at the same time with a second current 12. When the remaining amount of electric power c of the first battery and the third battery both reach the third amount of electric power threshold C3, the process of charging enters into the CV phase, and the charging unit 13 charges the first battery and the third battery at the same time with a first voltage V1. Wherein, the first time period T1, the second time period T2 and the CV phase are successive time periods, that is, they are one after another but not overlapped. FIG. 2 illustrates diagram of the current in this case. The first current 11 can be a maximum current allowable in all of the charging circuit 10, the first battery and the second battery so as to save charging time. The second current 12 can be a half of the first current 11, thus the charging circuit 10 can charge the two batteries at the same time, and, in case that the two batteries are charged at the same time, the second current 12 is also a maximum current that the two batteries can obtain respectively, so as to save the charging time.

The second amount of electric power threshold C2 may be 80% of nominal amount of electric power of the battery, and the third amount of electric power threshold C3 may be 90% of nominal amount of electric power of the battery. However, this disclosure is not limited thereto, the amount of electric power threshold C2 and C3 may be any value for those skilled in the art, and the respective amount of electric power threshold C2 of the N batteries may be same or may be different from each other, and the respective amount of electric power threshold C3 may be same or may be different from each other. Further, this case 2 is not limited to entering into the second time period T2 when the remaining amount of electric power c of two batteries to be charged both reach the second amount of electric power threshold C2, the charging unit 13 can make the process of charging to enter into the second time period T2 when the remaining amount of electric power c of one battery among others reaches the second amount of electric power threshold C2, so as to use the second current 12 to charge the two batteries at the same time. Further, this case 2 is not limited to entering into the CV phase when the remaining amount of electric power c of the two batteries to be charged both reach the third amount of electric power threshold C3, and the charging unit 13 can make the process of charging to enter into the CV phase when the remaining amount of electric power c of one battery among others reaches the third amount of electric power threshold C3.

Alternatively, in the second time period T2, the charging unit 13 can use the second current 12 to charge the first battery and the second battery alternately in a time-sharing manner similar to that in the first time period T1, and at this time, a value of the second current 12 may be: $0.5I1<I2<I1$, so as to charge in a relative large current to save the charging time. FIG. 3 illustrates diagram of the current in this case.

Alternatively, the second time period T2 may be divided into several sub time periods, the charging unit 13 uses a time-sharing and hierarchic manner to charge in the second time period T2, that is, uses different charging currents to charge in time-sharing respectively in the respective sub time periods, and the charging currents in the respective sub time periods decrease step by step, and the charging current in a sub time period closer to the first time period T1 is larger. FIG. 4 illustrates the currents in a case that the second time period T2 is divided into two sub time periods (a first sub time period T2' and a second sub time period T2"). As shown in FIG. 4, in the first sub time period T2', the charging unit 13 uses a current $0.8I1$ to charge the first battery and the second battery alternately in the time-sharing manner, and then in the second sub time period T2", the charging unit 13 uses a current $0.6I1$ to charge the first battery and the second battery alternately in the time-sharing manner. However, this disclosure is not limited thereto, number of the sub time periods in the second time period T2, time length of each sub time period and size of the charging current in each sub time period can be set by the user, or can also be set by the charging circuit 10 according to cases of the remaining amount of electric power of the battery, as long as the charge efficiency is improved by using the time-sharing and hierarchic manner.

Case 3: the battery needs to be charged decided by the charging deciding unit 12 is n pieces ($3 \leq n \leq N$), and the charging unit 12 uses the time-sharing manner to charge the n batteries in the CC phase. Though the case of charging the n batteries is slightly different from the case of charging the two batteries, case 3 is still described with reference to FIGS. 2 to 4 here in order to simplify explanation. In particular, in the first time period T1, the n batteries are charged in order in the time-sharing manner with the first current 11. When the remaining amount of electric power c of the one or more batteries reaches the second amount of electric power threshold C2, the process of charging enters into the second time period T2, and the charging unit 13 charges the n batteries at the same time with a second current 12. When the remaining amount of electric power c of the one or more batteries reaches the third amount of electric power threshold C3, the process of charging enters into the CV phase, and the charging unit 13 charges the n batteries at the same time with a first voltage V1. Wherein, the first time period T1, the second time period T2 and the CV phase are successive time periods, that is, they are one after another but not overlapped.

For example, in the first time period T1, a first battery to be charged is charged for 10 seconds with the first current 11 firstly, and then a second battery to be charged is charged for 10 seconds, and then a third battery to be charged is charged for 10 seconds, and so on, until each of the n batteries to be charged is charged for 10 seconds respectively, and then the above-described steps are repeated until the remaining amount of electric power c of one or more battery in the n batteries reaches the second amount of electric power threshold C2, and then the second time period T2 is entered into. In the second time period T2, the first current 11 is divided into n shares evenly, and each share of the current is as the second current 12 so as to charge the n batteries at the same time.

Alternatively, similar to the case 2, in the second time period T2, the charging unit 13 can use the second current 12 to charge the n batteries in order in the time-sharing manner similar to that in the first time period T1, and at this time, the value of the second current 12 may be: $0.5I1<I2<I1$. Alternatively, similar to case 2, the second time period T2 may be divided into several sub time periods, the charging unit 13 charges in the time-sharing and hierarchic manner in the second time period T2. Since it is similar to the time-sharing and hierarchic manner in the above case 2, it is no longer described here.

It is noted that, in the case 2 and the case 3, the number of the battery to be charged in the first time period T1 may be different from the number of the battery to be charged in the second time period T2, for example, in the case 3, after the first time period T1, the remaining amount of electric power c of a certain battery has already reached the third amount of electric power threshold C3, thus, in the second time period T2, n-1 batteries are charged at the same time or charged in time-sharing or charged in time-sharing and hierarchically as above mentioned. Then, the n batteries are charged by using the constant voltage manner in the CV phase so that the n batteries can be fully charged.

Further, the description on the above process of charging omits the PC phase, and those skilled in the art can select the charging current and the charging time of the PC phase according to practical situation, and there does not describe here.

Further, the charging unit 13 can include a charging time determining module for determining respective time-sharing charging times of the plurality of batteries charged through the time-sharing manner in the first time period T1 and determining respective time-sharing charging times of the plurality of batteries when the charging unit 13 continues to adopt the time-sharing manner or the time-sharing and hierarchic manner to charge in the second time period T2. Wherein, the respective time-sharing charging times of the plurality of batteries charged in the first time period T1 and the second time period T2 determined by the charging time determining module can be equal to each other, or can be in proportion with each other based on the remaining amount of electric power of the plurality of batteries charged.

The charging time determining module is described detailed still by taking the charging deciding unit 12 deciding that the batteries need to be charged are two pieces (i.e., the first battery and the second battery) as example. When the electric power detecting unit 11 detects that the remaining amounts of electric power c of the first battery and the second battery are both 60%, the charging time determining module set time-sharing alternate charging times of the first battery and the second battery in the first time period T1 as being equal to each other, that is, t1' and t1" shown in FIG. 2 are equal to each other. When the electric power detecting unit 11 detects that the remaining amount of electric power c of the first battery is 80% and the remaining amount of electric power c of the second battery is 60%, the charging time determining module sets each time time-sharing charging time of the first battery as a half of each time time-sharing charging time of the second battery in the first time period T1, that is, t1'=0.5×t1".

However, this disclosure is not limited thereto, in the first time period T1, the respective time-sharing charging times of the first battery and the second battery can be determined according to proportions of the respective remaining amount of electric power c thereof, or set by the user as required, for example, when the remaining amounts of electric power c of the first battery and the second battery are equal to each other, if the user wishes that the first battery is fully charged as soon as possible and the second battery can be fully charged slightly slowly, the user can set the time-sharing charging time t1' of the first battery as being larger than the time-sharing charging time t1" of the second battery in the first time period T1.

Further, for a case in which the charging unit 13 continues to adopt time-sharing alternate charging to the first battery and the second battery in the second time period T2, the charging time determining module can adopt a manner similar to that determines t1' and t1" in the first time period T1 to determine the time-sharing charging time t2' of the first battery and the time-sharing charging time t2" of the second battery in the second time period T2. In particular, after the constant-current charging in the first time period T1, if the remaining amounts of electric power c of the first battery and the second battery are equal, the charging time determining module may determine the time-sharing charging time t2' of the first battery and the time-sharing charging time t2" of the second battery as being equal to each other; and if the remaining amounts of electric power c of the first battery and the second battery are different, the time-sharing charging time t2' and t2" can be determined according to the proportion of the remaining amount of electric power c of the first battery to the remaining amount of electric power c of the second battery, wherein the time-sharing charging time of a battery having a larger remaining amount of electric power c can be shorter than the time-sharing charging time of a battery having a smaller remaining amount of electric power c. Further, the time-sharing charging time t2' of the first battery, the time-sharing charging time t2" of the second battery and the proportion thereof can be set by the user as required.

Further, the charging unit 13 further includes a current limiting module for determining and holding the first current 11 and the second current 12 respectively for the first time period T1 and the second time period T2. In practice, size of currents in the PC phase and the CC phase can be determined according to a nominal capacity of the battery to be charged. For example, if the nominal capacity of the battery is 1000 mhA, when the charging current is less than 100 mA, it can be considered as the trickle charging; when the charging current is larger than 200 mA and less than 800 mA, it can be considered as the constant-current charging of a large current; and if the nominal capacity of the battery is 200 mhA, a charging current of 100 mA can be a large current of the constant-current charging. Thus it can be seen, size of the charging current 11 and 12 in the first embodiment is relative, that is, for the first current 11 of the first battery and the first current 11 of the second battery, they can be equal, or correspond to the respective nominal capacity of the battery respectively. Therefore, the current limiting module can determine size of the charging current according to corresponding nominal capacity of the battery that needs to be charged decided by the charging deciding unit 12. Or, the current limiting module can determine a range of usable charging current for the battery that needs to be charged, and then the user selects in this range.

Further, the charging unit 13 also includes a constant voltage module for determining and holding a first voltage V1 for the CV phase.

Further, the charging deciding unit 12 can be provided with a fourth amount of electric power threshold C4 which is less than the first amount of electric power threshold C1 in advance, wherein relationship of sizes of the above-described amount of electric power thresholds C1, C2, C3 and C4 may be C4<C2<C3<C1. The charging deciding unit 12 is for comparing the remaining amount of electric power c of each battery detected by the amount of electric power detecting unit 11 with the fourth amount of electric power preset threshold C4. If the amount of electric power detecting unit 11 detects that the remaining amount of electric power c of a certain battery is less than the fourth amount of electric power threshold C4, the charging deciding unit 12 pauses determining process of other batteries, and make the charging unit 13 to charge the battery with the first current 11 preferentially until the remaining amount of electric power c of this battery is equal to the fourth amount of electric power preset threshold C4, and then the charging deciding unit 12 resume the determining process of other batteries. Thereby, the charging circuit 10 can ensure that the respective batteries are able to reach a basic remaining amount of electric power c, i.e., the fourth amount of electric power threshold C4 firstly, and then execute process of charging such as the above-described time-sharing charging to the respective batteries at this basis, thus, the charging time determining module and the current limiting module are facilitated to calculate time of the time sharing and size of the charging current of the respective batteries respectively, and also the respective batteries are facilitated to be fully charged at the same time.

Thereby, by using the above manner of the time-sharing charging, manner of the time-sharing and hierarchic charging or manner of first time-sharing charging and then simultaneous charging to the plurality of batteries in the CC phase, and by using the above manner of simultaneous charging in the CV phase, not only the charge efficiency of the plurality of batteries is improved, it can also implement fully charging of the plurality of batteries at the same time, and provide time for dissipating the heat of the battery through the time-sharing manner, so as to reduce the damage to the battery due to the heat generated by a continue large current charging. And, since it adopts the time-sharing charging manner in the CC phase, there is time for heat dissipation of the battery, the first charging current 11 can be a charging current larger than that of the conventional fast charging technique, so as to be able to reduce the damage of the battery at the same time of improving the charge efficiency.

Figure 5:
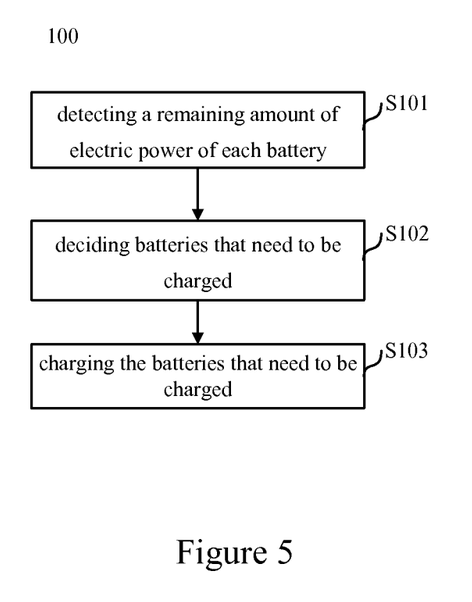
FIG. 5 is a flow chart illustrating the multi-battery charging method according to a second embodiment.

Next, the multi-battery charging method of the second embodiment is described with reference to FIG. 5. FIG. 5 is a flow chart illustrating a multi-battery charging method 100 of the second embodiment. Here, the method 100 is described detailed with reference to the functional configuration of the charging circuit 10 shown in FIG. 1 and the charging current shown in FIGS. 2 to 4.

As shown in FIG. 5, in step S101, a remaining amount of electric power of each battery is detected.

In particular, each battery is scanned in order at a predetermined time interval t by the electric power detecting unit 11 so as to acquire instant amount of electric power parameter value of each battery, for example, the voltage value, and remaining amount of electric power c of each battery is calculated accordingly. The time interval t may be 1 minute, and this disclosure is not limited thereto, and the time interval t may be any time length for those skilled in the art, or may be set by the user according to the practical requirement.

In step S102, the battery that needs to be charged is decided.

In particular, a first amount of electric power threshold C1 is provided in the charging deciding unit 12 in advance, and the charging deciding unit 12 compares the remaining amount of electric power c of each battery detected in step S101 with the first amount of electric power threshold C1, and the charging deciding unit 12 decides that this battery needs to be charged when c≤C1. The first amount of electric power threshold C1 may be 99%, but this disclosure is not limited thereto, and the first amount of electric power threshold C1 may be set by the user in advance, and may also be set by the electronic apparatus according to the cases of the remaining amount of electric power of respective batteries.

In step S103, the battery that needs to be charged decided in the step S102 is charged.

In particular, if the battery that needs to be charged decided in step S102 is only one piece, the battery is charged by adopting the conventional charge technique in step S103.

If the batteries that need to be charged decided in step 102 is two pieces (a first battery and a second battery), in step S103, the charging unit 13 charges the two batteries in the time-sharing manner in the CC phase, and charges the two batteries by using the constant voltage manner in the CV phase. In particular, as shown in FIG. 2, the charging unit 13 divides the CC phase into two time periods, i.e., the first time period T1 and the second time period T2. Firstly, the charging unit 13 charges the first battery and the second battery alternately in the time sharing manner with the first current 11 in the first time period T1. When the remaining amounts of electric power c of the first battery and the second battery both reach the second amount of electric power threshold C2, the process of charging enters into the second time period T2, and the charging unit 13 charges the first battery and the second battery at the same time with a half of the first current 11 as the second current 12. When the remaining amounts of electric power c of the first battery and the third battery both reach the third amount of electric power threshold C3, the process of charging enters into the CV phase, and the charging unit 13 charges the first battery and the third battery at the same time with a first voltage V1. Wherein, the first time period T1, the second time period T2 and the CV phase are successive time periods, that is, they are one after another but not overlapped. The first current 11 can be a maximum current allowable in all of the charging circuit 10, the first battery and the second battery so as to save charging time. The second current 12 can be a half of the first current 11.

Alternatively, in the second time period T2 of step S103, as shown in FIG. 3, the first battery and the second battery are charged alternately by using the time-sharing manner similar to that in the first time period T1, and at this time, a value of the second current 12 may be: 0.511<12<11.

Alternatively, the second time period T2 of the step S103 can be divided into several sub time periods, and different charging currents are adopted in the respective sub time periods to charge in time-sharing, and the charging currents in the respective sub time periods decrease step by step, the charging current in the sub time period closer to the first time period T1 is larger. As shown in FIG. 4, the second time period T2 is divided into the first sub time period T2' and the second sub time period T2", the current 0.811 is used to charge the two batteries alternately in the time-sharing manner in the first sub time period T2' firstly, and then in the second sub time period T2", the current 0.611 is used to charge the two batteries alternately in the time-sharing manner. However, this disclosure is not limited thereto, number of the sub time periods in the second time period T2, time length of each sub time period and size of the charging current in each sub time period can be set by the user, or can also be set by the charging circuit 10 according to cases of the remaining amount of electric power of the battery, as long as the charge efficiency is improved by using the time-sharing and hierarchic manner.

If the batteries that need to be charged decided in step S102 is n pieces (3≤n≤N), then the time-sharing manner adopted in the CC phase in step S103 is n batteries, the time-sharing manner is similar to the above manner of time-sharing charging the two batteries, and is different in that the n batteries are charged in time-sharing in order here. In particular, in the first time period T1, the n batteries are charged in order in the time-sharing manner with the first current 11. When the remaining amount of electric power c of one or more batteries reaches the second amount of electric power threshold C2, the process of charging enters into the second time period T2, and the charging unit 13 charges the n batteries at the same time with the second current 12. When the remaining amount of electric power c of the one or more batteries reaches the third amount of electric power threshold C3, the process of charging enters into the CV phase, and the charging unit 13 charges the n batteries at the same time with the first voltage V1. Wherein, the first time period T1, the second time period T2 and the CV phase are successive time periods, that is, they are one after another but not overlapped.

For example, in the first time period T1, a first battery that needs to be charged is charged for 10 seconds with the first current 11 firstly, and then a second battery that needs to be charged is charged for 10 seconds, and then a third battery that needs to be charged is charged for 10 seconds, and so on, until each of the n batteries to be charged is charged for 10 seconds respectively, and then the above-described steps are repeated. In the second time period T2, the first current 11 is divided into n shares evenly, and each share of current is as the second current 12 so as to charge the n batteries at the same time.

Alternatively, in step S103, the n batteries are charged in order in the time-sharing manner similar to that in the first time period T1 by using the second current 12 by the charging unit 13 in the second time period T2, and at this time, the value of the second current 12 may be: 0.511<12<11. Alternatively, in step S103, the second time period T2 may be divided into several sub time periods by the charging unit 13, and a charging in the time-sharing and hierarchic manner is adopted in the second time period T2.

Further, in step S103, it further includes a trickle charging phase before the charging in the CC phase by the charging unit 13.

Further, in step S103, it can further determine respective charging times of the n batteries in the first time period T1, and determine respective charging times of the n batteries when the n batteries are charged in time-sharing or in time-sharing and hierarchically in the second time period T2. Wherein, the respective time-sharing charging times of the plurality of batteries charged in the first time period T1 and the second time period T2 determined in step S103 can be equal to each other, or can be in proportion with each other based on the remaining amount of electric power of the plurality of batteries charged.

Further, in step S103, it further determines and holds the first current I1 and the second current I2 respectively for the first time period T1 and the second time period T2.

Method for determining the respective charging times of the n batteries and the first current I1 and the second current I2 are explained correspondingly in the above first embodiment, and there is no longer described.

Further, in step S103, it can further determine and hold the first voltage V1 for the CV phase.

Further, in step S102, the remaining amount of electric power of each battery detected in step S101 can be compared with the fourth amount of electric power threshold C4, wherein the relationship of sizes of the above-described amount of electric power thresholds C1, C2, C3 and C4 may be C4<C2<C3<C1. When the remaining amount of electric power of a certain battery detected is less than the fourth amount of electric power threshold C4, step S102 pauses decision of other batteries, and the amount of electric power of this battery is charged to the fourth amount of electric power threshold C2 with the first current I1 in step S103, and then decision of other batteries in step S102 is resumed.

Thus it can be seen, by the multi-battery charging circuit and charging method provided according to this disclosure, not only the charge efficiency of a plurality of batteries is improved, it can also implement fully charging of the plurality of batteries at the same time, and also provide time for dissipating heat of the battery by the time sharing manner, so as to reduce damage to the battery due to the heat generated by a continue charging of large current.

Those skilled in the art can realize that, the units and algorithm steps of respective examples described in combination with the embodiments disclosed in the specification can be implemented by electronic hardware, computer software or the combination of both, in order to explain the interchange ability of the hardware and the software, the constitutions and steps of the respective examples are described generally according to the functions in the above description. Whether the functions are executed by hardware or software is depending to the specific applications and design constraints of the technical solution. Those skilled in the art can implement the described functions by using different methods for each specific application, and such implementations are not regarded as beyond the scope of this disclosure.

Those skilled in the art should understand: the above respective embodiments are only for explaining the technical solutions of this disclosure but not limited thereto; though this disclosure is explained detailed with reference to the above respective embodiments, those skilled in the art can modify the technical solutions recorded by the above respective embodiments, or execute equivalent replacements to a part of or all of the technical features therein; and these modifications or replacements do not make essence of the corresponding technical solutions to depart from scope of the claims of this disclosure.

The invention claimed is:

1. A multi-battery charging circuit applied in an electronic apparatus for charging at least two batteries, the multi-battery charging circuit comprising:
an electric power detecting unit configured to detect a remaining amount of electric power of each battery;
a charging deciding unit provided with a first amount of electric power threshold and configured to compare the remaining amount of electric power of each battery detected by the electric power detecting unit, wherein the charging deciding unit is operable to charge the batteries when the remaining amount of electric power of the batteries as detected is less than or equal to the first amount of electric power threshold; and
a charging unit provided with a second amount of electric power threshold and a third amount of electric power threshold and configured to charge the batteries, wherein
the charging unit is operable to charge the batteries with a first strategy in a first time period, to charge the batteries with a second strategy in a second time period when the remaining amount of electric power of one or more of the batteries is equal to the second amount of electric power threshold, and to charge the batteries with a third strategy in a third time period when the remaining amount of electric power of one or more of the batteries is equal to the third amount of electric power threshold, the first time period, the second time period and the third time period being successive time periods.

2. The multi-battery charging circuit according to claim 1, wherein the first strategy is to charge the batteries one after another separately with a first current, and the third strategy is to charge the batteries at the same time with a first voltage.

3. The multi-battery charging circuit according to claim 1, wherein the second strategy is to charge the batteries at the same time with a second current.

4. The multi-battery charging circuit according to claim 3, wherein the second current is a constant current.

5. The multi-battery charging circuit according to claim 3, wherein the second current is smaller in magnitude than a first current for charging the batteries in the first strategy.

6. The multi-battery charging circuit according to claim 1, wherein the charging unit comprises a charging time determining module configured to determine respective charging times of the batteries in the first strategy and to determine respective charging times of the batteries in the second strategy.

7. The multi-battery charging circuit according to claim 6, wherein the respective charging times of the batteries in the first strategy and the second strategy as determined by the charging time determining module are equal to each other or in proportion with each other based on the remaining amount of electric power of the batteries.

8. The multi-battery charging circuit according to claim 1, wherein the charging unit comprises a current limiting module configured to determine charging currents for the first strategy and the second strategy, respectively.

9. The multi-battery charging circuit according to claim 2, wherein the charging unit comprises a constant voltage module configured to determine the first voltage for the third strategy.

10. The multi-battery charging circuit according to claim 1, wherein the charging deciding unit is provided with a fourth amount of electric power threshold which is less than the first amount of electric power threshold, and the charging deciding unit is further configured to compare the remaining amount of electric power of each battery detected by the amount of electric power detecting unit with the fourth amount of electric power threshold, wherein upon detecting the remaining amount of electric power of a specific battery to be less than the fourth amount of electric power threshold, the charging unit is operable to charge that battery to the fourth amount of electric power threshold.

11. A multi-battery charging method applied in an electronic apparatus having at least two batteries, the method comprising:

detecting a remaining amount of electric power of each battery by an electric power detecting unit of the electronic apparatus;

comparing the remaining amount of electric power of each battery with a first amount of electric power threshold by a charging deciding unit of the electronic apparatus, wherein the batteries need to be charged when the remaining amount of electric power of the batteries is less than or equal to the first amount of electric power threshold; and charging the batteries that need to be charged by a charging unit of the electronic apparatus, wherein the batteries are charged with a first strategy in a first time period, with a second strategy in a second time period when the remaining amount of electric power of the batteries is equal to a second amount of electric power threshold, and with a third strategy in a third time period when the remaining amount of electric power of the batteries is equal to a third amount of electric power threshold, the first time period, the second time period and the third time period being successive time periods.

12. The method according to claim 11, wherein the first strategy is charging the batteries one after another separately with a first current.

13. The method according to claim 11, wherein the second strategy is charging the batteries at the same time with a second current.

14. The method according to claim 13, wherein the second current is a constant current.

15. The method according to claim 13, wherein the second current is smaller in magnitude than a first current for charging the batteries in the first strategy.

16. The method according to claim 11, wherein the charging of the batteries comprises determining respective charging times of the batteries in the first strategy and for determining respective charging times of the batteries in the second strategy by a charging time determining module of the electronic apparatus.

17. The method according to claim 16, wherein the respective charging times of the batteries in the first strategy and the second strategy determined by the charging time determining module of the electronic apparatus are equal to each other or in proportion with each other based on the remaining amount of electric power of the batteries.

18. The method according to claim 11, wherein the charging of the batteries comprises determining charging currents for the first strategy and the second strategy respectively by a current limiting module of the electronic apparatus.

19. The method according to claim 12, wherein the charging of the batteries comprises determining the first voltage for the third strategy by a constant voltage module of the electronic apparatus.

20. The method according to claim 11, wherein the step of comparing the remaining amount of electric power of each batter with the first amount of electric power threshold further comprises comparing the remaining amount of electric power of each battery detected with a fourth amount of electric power threshold which is less than the first amount of electric power threshold by the charging deciding unit of the electronic apparatus, wherein upon detecting the remaining amount of electric power of a specific battery to be less than the fourth amount of electric power threshold, charging that battery to the fourth amount of electric power threshold by the charging unit of the electronic apparatus.

* * * * *